US008453939B2

(12) United States Patent
Lee

(10) Patent No.: US 8,453,939 B2
(45) Date of Patent: Jun. 4, 2013

(54) SMART CARD SUPPORTING A PLURALITY OF INTERFACES AND INTERFACE METHOD THEREOF

(75) Inventor: Seungwon Lee, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/191,570

(22) Filed: Jul. 27, 2011

(65) Prior Publication Data

US 2012/0024964 A1   Feb. 2, 2012

(30) Foreign Application Priority Data

Jul. 29, 2010   (KR) ........................ 10-2010-0073618

(51) Int. Cl.
*G06K 19/06* (2006.01)
*G06K 19/00* (2006.01)
*G06K 7/00* (2006.01)
*G06K 7/08* (2006.01)
*G06F 17/00* (2006.01)

(52) U.S. Cl.
USPC ........... 235/492; 235/487; 235/451; 235/375; 235/440

(58) Field of Classification Search
CPC ..... G06K 7/0008; G06K 19/077; G06K 19/04; G06K 7/0004; G06K 7/084; G06K 7/0021; G06K 13/08; G06K 19/07749; G06K 19/0723; G06K 17/00; G06F 3/1454; G06F 3/147; G06Q 30/06; G06Q 20/341; G06Q 30/02; G06Q 10/087; G09F 3/02; B42D 15/10; G07F 7/1008

USPC ................ 235/451, 487, 492, 375, 440
See application file for complete search history.

(56) References Cited

U.S. PATENT DOCUMENTS

| 5,206,495 | A | * | 4/1993 | Kreft ............................ 235/492 |
| 5,241,160 | A | * | 8/1993 | Bashan et al. ................ 235/380 |
| 5,929,414 | A | * | 7/1999 | Saitoh .......................... 235/380 |
| 6,045,043 | A | * | 4/2000 | Bashan et al. ................ 235/441 |
| 6,161,762 | A | * | 12/2000 | Bashan et al. ................ 235/492 |
| 6,168,077 | B1 | * | 1/2001 | Gray et al. .................... 235/375 |
| 6,168,083 | B1 | * | 1/2001 | Berger et al. ................. 235/492 |
| 6,378,774 | B1 | * | 4/2002 | Emori et al. .................. 235/492 |
| 6,439,464 | B1 | * | 8/2002 | Fruhauf et al. ............... 235/492 |
| 7,156,314 | B2 | * | 1/2007 | Kargl ............................ 235/492 |
| 7,237,719 | B2 | * | 7/2007 | Fruhauf ........................ 235/451 |
| 7,255,284 | B2 | * | 8/2007 | Kim et al. ..................... 235/492 |
| 7,308,588 | B2 | * | 12/2007 | Nishizawa et al. ........... 713/310 |
| 7,472,834 | B2 | * | 1/2009 | Conraux et al. .............. 235/492 |
| 7,533,209 | B2 | * | 5/2009 | Croyle .......................... 710/305 |
| 7,558,110 | B2 | * | 7/2009 | Mizushima et al. ..... 365/185.04 |
| 7,690,570 | B2 | * | 4/2010 | Fruhauf ........................ 235/451 |

(Continued)

FOREIGN PATENT DOCUMENTS

| JP | 2004-133843 | 4/2004 |
| JP | 2005-078651 | 3/2005 |
| KR | 1020090085878 | 8/2009 |

*Primary Examiner* — Daniel Walsh
(74) *Attorney, Agent, or Firm* — Stanzione & Kim, LLP

(57) ABSTRACT

A smart card that may include a first interface circuit to perform a first type interface with the outside using first and second pads; a second interface circuit to perform a second type interface with the outside using the first and second pads; and a mode selector to enable one of the first and second interface circuits according to whether a power supply voltage is supplied through a third pad.

18 Claims, 5 Drawing Sheets

U.S. PATENT DOCUMENTS

| | | | |
|---|---|---|---|
| 7,761,647 B2 * | 7/2010 | Yang | 710/316 |
| 8,186,602 B2 * | 5/2012 | Itay et al. | 235/492 |
| 2003/0230631 A1 * | 12/2003 | Tsunoda et al. | 235/492 |
| 2005/0045720 A1 * | 3/2005 | Fruhauf | 235/440 |
| 2005/0212690 A1 * | 9/2005 | Nishikawa | 340/932.2 |
| 2005/0252978 A1 * | 11/2005 | Nishizawa et al. | 235/492 |
| 2005/0274803 A1 * | 12/2005 | Lee | 235/439 |
| 2006/0032927 A1 * | 2/2006 | Kargl | 235/492 |
| 2006/0086806 A1 * | 4/2006 | Conraux et al. | 235/492 |
| 2006/0113385 A1 * | 6/2006 | Chan et al. | 235/440 |
| 2006/0131413 A1 * | 6/2006 | Morita | 235/451 |
| 2006/0131430 A1 * | 6/2006 | Ito | 235/492 |
| 2006/0151614 A1 * | 7/2006 | Nishizawa et al. | 235/492 |
| 2006/0186211 A1 * | 8/2006 | Kim et al. | 235/492 |
| 2007/0175994 A1 * | 8/2007 | Fruhauf | 235/440 |
| 2008/0000989 A1 * | 1/2008 | Chen et al. | 235/492 |
| 2008/0073436 A1 * | 3/2008 | Nishizawa et al. | 235/492 |
| 2008/0093466 A1 * | 4/2008 | Tsunoda et al. | 235/492 |
| 2008/0257967 A1 * | 10/2008 | Nishizawa et al. | 235/492 |
| 2010/0294843 A1 * | 11/2010 | Kim | 235/492 |
| 2011/0042464 A1 * | 2/2011 | Itay et al. | 235/492 |
| 2011/0101108 A1 * | 5/2011 | Slikkerveer et al. | 235/492 |
| 2012/0317325 A1 * | 12/2012 | Zhang et al. | 710/301 |

* cited by examiner

SMART CARD SUPPORTING A PLURALITY OF INTERFACES AND INTERFACE METHOD THEREOF

CROSS-REFERENCE TO RELATED APPLICATIONS

This U.S. non-provisional patent application claims priority under 35 U.S.C. §119 of Korean Patent Application No. 10-2010-0073618, filed on Jul. 29, 2010, the entire contents of which are hereby incorporated by reference.

BACKGROUND OF THE INVENTION

1. Field of the Invention

The present inventive concept herein relates to a smart card and an interface method thereof.

2. Description of the Related Art

A "smart card" refers to a card into which an integrated circuit is inserted, and the integrated circuit may comprise a microprocessor, a card operating system, a security module, a memory, etc. A smart card module inserted into most of the smart cards includes a printed circuit board (PCB) on which an integrated circuit chip is mounted. One side of the printed circuit board (PCB) includes an integrated circuit chip and the other side of the printed circuit board (PCB) includes eight electrical contacts according to the international organization for standardization (ISO) 7816.

As uses of a smart card have been diversified, a need for a communication with a host using various interfaces is increasing. Thus, a development of a smart card that can support various interfaces through the limited eight electrical contacts is required.

SUMMARY OF THE INVENTION

Embodiments of the inventive concept provide a smart card.

Additional aspects and advantages of the present general inventive concept will be set forth in part in the description which follows and, in part, will be obvious from the description, or may be learned by practice of the general inventive concept.

In exemplary embodiments of the present inventive concept, the smart card may include a first pad; a second pad; a third pad being supplied with a power supply voltage; a first interface circuit to perform a first type interface with the outside using the first and second pads; a second interface circuit to perform a second type interface with the outside using the first and second pads; and a mode selector enabling one of the first and second interface circuits according to whether or not the power supply voltage is supplied through the third pad.

Embodiments of the inventive concept also provide a smart card that may include a first pad that can be connected to a host; a second pad that can be connected to the host; a third pad being supplied with a power supply voltage; an internal circuit block; and an interface module to perform an interface between the host and the internal circuit block using the first and second pads, wherein the interface module performs an interface with the host in one of the first and second type interfaces according to whether the power supply voltage is supplied through the third pad.

Embodiments of the inventive concept also provide an interface method of the interface module in a smart card including a plurality of pads, an interface module and an internal circuit block. The interface method may include determining whether a power supply voltage is supplied through a power supply pad; performing a first type interface between the outside and the internal circuit block using first and second pads when the power supply voltage is supplied through the power supply pad; and performing a second type interface between the outside and the internal circuit block using the first and second pads when the power supply voltage is not supplied through the power supply pad.

Embodiments of the inventive concept also provide a smart card including an interface module including a first interface unit to perform a first type of interface externally using a first set of contact pads to transmit data to a host by wire and wirelessly, and a second interface unit to perform a second type of interface externally using the first set of contact pads; a power supply voltage pad to receive power for an external host; and a mode selector to determine whether to enable the first or second interface unit according to whether power is supplied to the power supply voltage pad.

In an embodiment, the first interface unit is a USB mode interface and the second interface unit is a contactless mode interface.

In an embodiment, the mode selector enables the first interface unit when power is supplied to the power supply pad, and enables the second interface unit when power is not supplied to the power supply pad.

In an embodiment, if the mode selector determines that power is supplied to the power supply pad, and a signal received through the first set of contact pads is not suitable to the USB standard, then the mode selector disables the first interface unit and the second interface unit and operates in a serial input output (SIO) mode.

In an embodiment, the smart card further includes fourth through sixth pads; and a third interface unit to perform a third type interface externally using the fourth through sixth pads, wherein the mode selector disables the first and second interface units when the power supply voltage is supplied through the third pad and a signal suitable for the USB standard is not received through the first set of contact pads.

Embodiments of the inventive concept also provide a method of interfacing a smart card having a plurality of pads, an interface module and an internal circuit block, the method including: switching between a first type interface between the internal circuit block and an external device and a second type interface between the internal circuit block and an external device according to a determination of whether a power supply voltage is being supplied through a power supply pad.

In an embodiment, the method may further include switching to a third type interface when it is determined that a power supply voltage is being supplied through a power supply pad while a predetermined signal is determined not to be suitable for the first or second type interface.

In an embodiment, the predetermined signal is a signal suitable for a USB standard, and the third type interface is a serial input output (SIO) interface.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
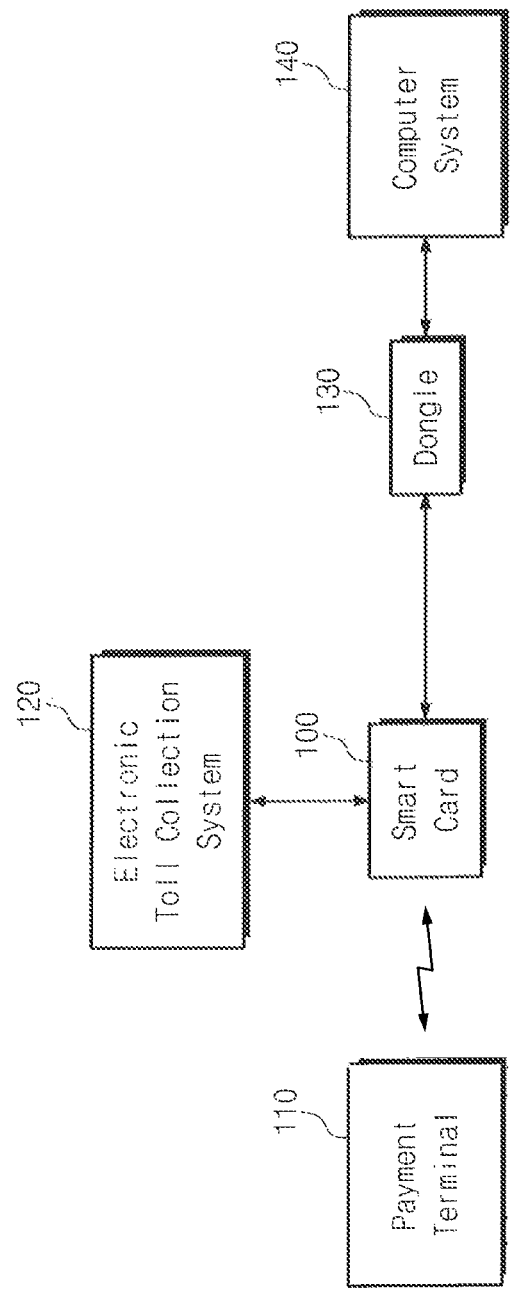
FIG. 1 is a drawing illustrating a smart card in accordance with exemplary embodiments of the inventive concept and electronic devices that can be connected to the smart card.

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

A smart card may be classified into a contact type card and a contactless type card, and there are a combination card and a hybrid card such that a contact type card and a contactless type card are combined. A contact type card must be inserted into the card reader and receives a power and a clock signal that are needed to operate a chip by a physical contact through an insertion. A contact type card has a large amount of transmitting data as compared with a contactless type card and follows the international organization for standardization (ISO) 7816. On the other hand, a contactless type card operates at a distance without being inserted into the card reader and follows the international organization for standardization (ISO) 10536 and the international organization for standardization (ISO) 14443.

According to an interface method provided in the international organization for standardization (ISO) 7816, the number of contact pads of a smart card is eight. A function of each of the contact pads (C1-C8) is defined in a table 1 as follows.

TABLE 1

| PIN # | Assignment |
| --- | --- |
| C1 | VDD |
| C2 | RESET |
| C3 | CLOCK |
| C4 | RESERVED |
| C5 | VSS |
| C6 | VPP |
| C7 | I/O |
| C8 | RESERVED |

Referring to table 1, a contact pad C1 is used to receive a power needed for a smart card from an external host. A contact pad C2 is used to receive a reset signal resetting an internal circuit of a smart card. A contact pad C3 is used to receive a clock from a host. The clock is used to drive a microprocessor built in a smart card. A contact pad C5 is used to provide an electrical ground between a host and a smart card. A contact pad C6 may be used as a power supply pin (VPP) to program an electrically erasable programmable read only memory (EEPROM) built in a smart card. A contact pad C7 is used when a smart card inputs and outputs data using a half-duplex method. Contact pads C4 and C8 are contact pads that are not defined in the international organization for standardization (ISO) 7816 yet and are spare pads to be used in the future.

According to an interface method provided in the international organization for standardization (ISO) 14443 that is a standard of contactless type cards, a smart card must include an antenna to communicate with a host and needs at least two pads that can be connected to the antenna.

The contact pads C4 and C8 that are not defined in the international organization for standardization (ISO) 7816 yet are only needed to be assigned as a pad to connect a smart card to an antenna in order for one smart card to support a contact mode in accordance with the international organization for standardization (ISO) 7816 and a contactless mode in accordance with the international organization for standardization (ISO) 14443.

The international organization for standardization (ISO) 7816 may provide a data transmission speed of 9600 bps, 19200 bps and 38400 bps. The international organization for standardization (ISO) 7816 may be mainly used in an application field that needs a narrow communication bandwidth such as an automated teller machine (ATM) or a position certifying machine. However, as an e-commerce technology using an Internet or a cell phone is developed and a requirement for a real time software encryption and for transmission and reception of huge amounts of data such as an audio file and a video file increases, a smart card requiring a wide communication bandwidth is being emphasized.

A universal serial bus (USB) supports a data transmission speed of 480 Mbps or 5 Gbps using a power supply voltage line, a ground voltage line and two data lines. However, contact pads for a transmission of two data signals are needed besides the power supply voltage and the ground voltage in order for a smart card to support a USB interface.

The present inventive concept provides a smart card that can support not only the contact type mode of the international organization for standardization (ISO) 7816 and the contactless type mode of the international organization for standardization (ISO) 14443, but also the USB mode using the limited number of contact modes.

FIG. 1 is a drawing illustrating a smart card in accordance with exemplary embodiments of the inventive concept and electronic devices that can be connected to the smart card.

Referring to FIG. 1, a smart card 100 can communicate with a host in a contact mode, a contactless mode form or combinations thereof. For example, the smart card 100 can communicate with a payment terminal 110 in a contactless interface mode in accordance with the international organization for standardization (ISO) 10536 and the international organization for standardization (ISO) 14443. The smart card 100 can communicate with an electronic toll collection system 120 in a contact interface mode provided in the international organization for standardization (ISO) 7816. The smart card 100 can communicate with a computer system 140 in a USB interface mode through a dongle 130. The smart card 100 can communicate with various hosts in a contact mode and a contactless mode form besides a payment terminal 110, the electronic toll collection system 120 and the computer system 140.

Figure 2:
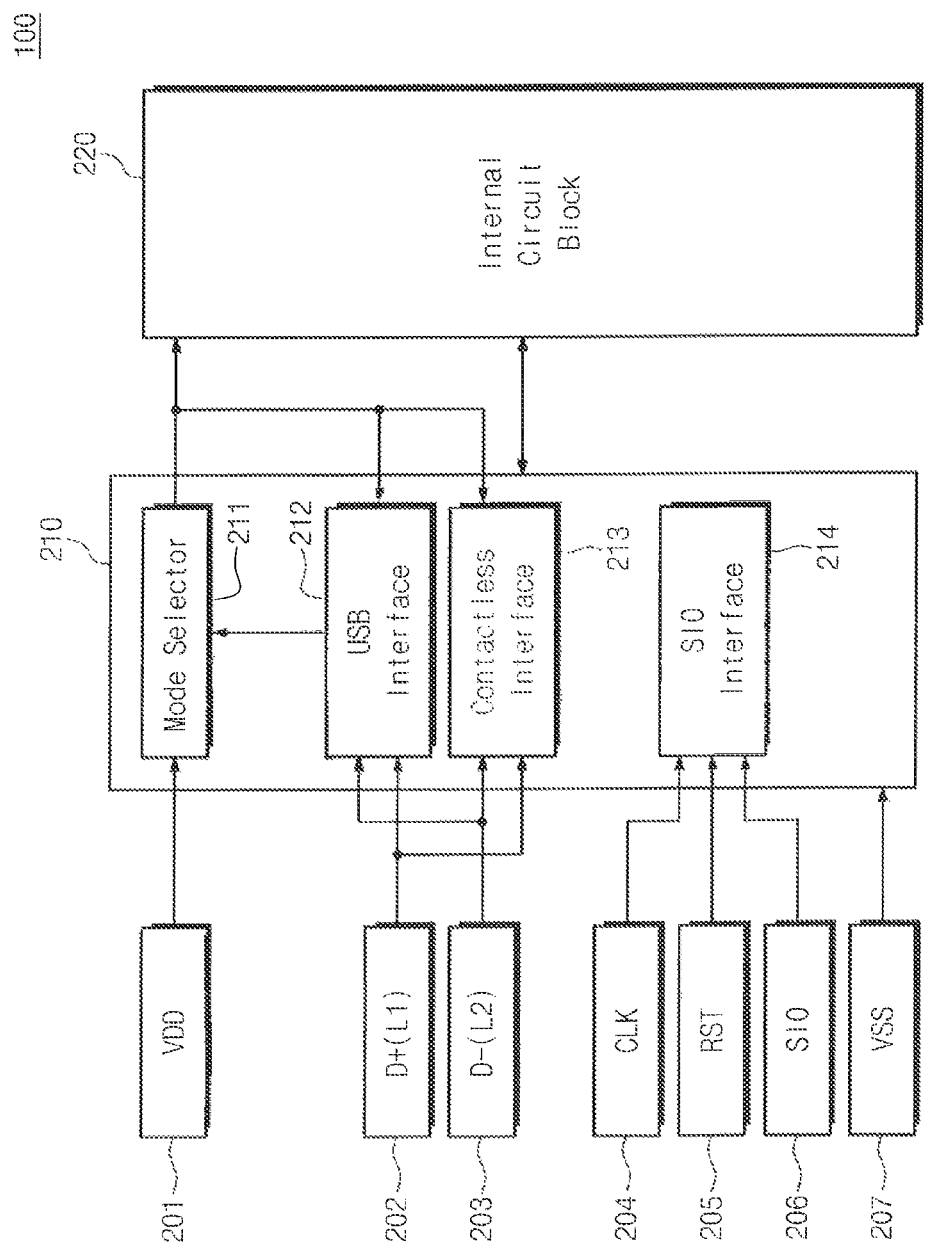
FIG. 2 is a block diagram illustrating a constitution of the smart card illustrated in FIG. 1.

FIG. 2 is a block diagram illustrating a constitution of the smart card illustrated in FIG. 1.

Referring to FIG. 2, the smart card 100 includes contact pads 201~207, an interface circuit 210 and an internal circuit block 220. The contact pads 201~207 may be connected to a host such as the payment terminal 110, the electronic toll collection system 120 and the computer system 140 illustrated in FIG. 1 in a contact type mode or in a contactless type mode through an antenna. Although only seven contact pads 201~207 are illustrated in FIG. 2, the inventive concept follows the number and locations of contact pads provided in the international organization for standardization (ISO) 7816, which is a smart card standard.

The contact pad 201 is used to receive a power needed for the smart card 100 from the external host. The contact pads 202 and 203 are used to transmit data between the smart card 100 and the host. When the smart card 100 communicates with the host in the USB mode, the contact pads 202 and 203 are used to transmit data signals D+ and D−. In the case that the smart card 100 communicates with the host in a contactless mode, the contact pads 202 and 203 are connected to an antenna to transmit wireless signals L1 and L2. The contact pad 204 is used to receive a clock from the host. The clock is used to drive the internal circuit block 220. The contact pad 205 is used to receive a reset signal to reset the interface module 210 and the internal circuit block 220. The contact pad 206 is used to transmit a data signal in a serial input output (SIO) mode, which is one of the contact modes. The contact mode 207 is used to provide an electrical ground between the host and the smart card 100.

The interface module 210 includes a mode selector 211, a USB interface 212, a contactless interface 213 and a serial input output (SIO) interface 214. The mode selector 211 determines whether the power supply voltage (VDD) is provided through the contact pad 201 and enables any one of the USB mode interface 212 and the contactless interface 213 according to whether the power supply voltage (VDD) is provided. That is, when the power supply voltage (VDD) is provided through the contact pad 201, the mode selector 211 enables the USB interface 212. When the power supply voltage (VDD) is not provided through the contact pad 201, the mode selector 211 enables the contactless interface 213. The mode selector 211 also provides selected mode information to the internal circuit block 220.

If the contactless interface 213 is enabled by the mode selector 211, the contactless interface 213 performs an interface connection so that the internal circuit block 220 communicates with the host through the contact pads 202 and 203 by the method defined in the international organization for standardization (ISO) 14443. For instance, the contactless interface 213 converts the wireless signals L1 and L2 received through the contact pads 202 and 203 into a clock signal and a data signal suitable for the internal circuit block 220. After coding a transmission signal outputted from the internal circuit block 220 using a Manchester code method and modulating the coded transmission signal using an on-off key (OOK) method, the contactless interface 213 transmits the modulated transmission signal to the host through the contact pads 202 and 203. Since the contactless interface 213 generates a power supply from the wireless signals L1 and L2 received through the contact pads 202 and 203, the contactless interface 213 is not required to be supplied with a separate power supply.

If the USB interface 212 is enabled by the mode selector 211, the USB interface 212 transmits the data signals D+ and D− to the host through the contact pad 202 and 203 in one of a high speed mode, a low speed mode, a full speed mode and a super speed mode defined in the USB standard. The USB interface 212 sets a USB operation mode according to the data signals D+ and D− received from the host through the contact pads 202 and 203 and performs an interface operation suitable for the USB operation mode. The USB interface 212 determines whether a signal received through the contact pads 202 and 203 is suited to the USB standard and provides the determined result to the mode selector 211. If a signal received through the contact pads 202 and 203 is determined not to be suited to the USB standard while the power supply voltage VDD is supplied through the contact pad 201, the mode selector 211 disables the USB interface 212 and operates in a serial input output (SIO) mode.

That is, if the power supply voltage VDD is supplied to the mode selector 211 through the contact pad 201, the mode selector 211 sets an operation mode in the USB mode to enable the USB interface 212. However, if the power supply voltage VDD is supplied through the contact pad 201 but a signal suitable for the USB standard is not received through the contact pads 202 and 203, the mode selector 211 disables the USB interface 212 and the contactless interface 213. At this time, the interface module 210 operates in a serial input output (SIO) mode by the SIO interface 214.

The SIO interface 214 starts an operation in response to a clock, a reset signal and a data signal received from the contact pads 204~206 and performs a communication interface between the host and the internal circuit block 220.

The internal circuit block 220 includes a microprocessor, a read only memory (ROM), a random access memory (RAM), an electrically erasable and programmable read only memory (EEPROM) and a security controller. The internal circuit block 220 communicates with the host through the interface module 210 and the contact pads 201~207 and performs a predetermined operation.

The smart card 100 illustrated in FIG. 2 can communicate with the host not only through the SIO mode and a contactless mode, but also through the USB mode using the contact pads 201~207.

Figure 3:
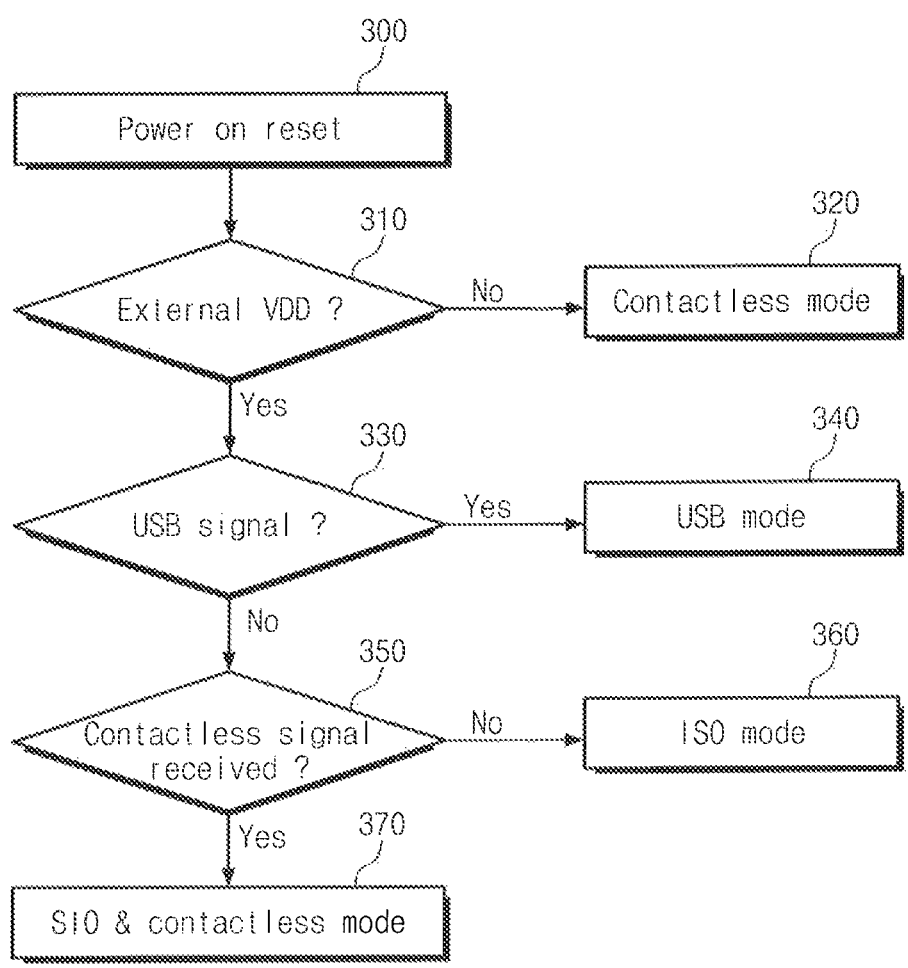
FIG. 3 is a flow chart illustrating an operation sequence of a smart card in accordance with exemplary embodiments of the inventive concept.

FIG. 3 is a flow chart illustrating an operation sequence of a smart card in accordance with exemplary embodiments of the inventive concept.

Referring to FIGS. 2 and 3, if a power supply is supplied to the smart card 100, the smart card 100 is reset (operation 300). In a reset state, if the power supply voltage VDD is not supplied from an external source through the contact pad 201 (operation 310), the interface module 210 in the smart card 100 operates in a contactless mode (operation 320). In a contactless mode, the signals L1 and L2 received through an antenna (not shown) and the contact pads 202 and 203 are provided to the internal circuit block 220 through the contactless interface 213 and a signal outputted from the internal circuit block 220 is transmitted to the host through the contactless interface 213, the contact pads 202 and 203 and the antenna.

If the power supply voltage VDD is supplied from an external source through the contact pad 201 and the data signals D+ and D− are received through the contact pads 202 and 203 (operation 330), the interface module 210 operates in the USB mode (operation 340). In the USB mode, the data signals D+ and D− received through the contact pads 202 and 203 are provided to the internal circuit block 220 through the USB interface 212 and a signal outputted from the internal circuit block 220 is transmitted to the host through the USB interface 212.

If the power supply voltage VDD is supplied from an external source through the contact pad 201 but any signal is not received through the contact pads 202 and 203 (operation 350), the interface module 210 operates in the SIO mode (operation 360). In the SIO mode, the interface module 210 operates in response to a signal received through the contact pads 204, 205 and 206.

If the power supply voltage VDD is supplied from an external source through the contact pad 201 and a signal, which is not suited to the USB standard, is received through the contact pads 202 and 203 (operation 350), the interface module 210 operates in the SIO mode and a contactless mode. That is, the contactless interface 213 communicates with the host through the contact pads 202 and 203 in a contactless type mode and the SIO interface 214 communicates with the host through the contact pads 204, 205 and 206 in a contact type mode. The SIO mode and a contactless mode may occur when a user pays a subway fee in a contactless mode in the state such that the smart card 100 is in contact with the host such as a card reader.

While the smart card described above is adapted to the number standard of contact pads defined in a smart card standard, it can operate in the USB mode, a contactless mode and a contact mode.

Figure 4:
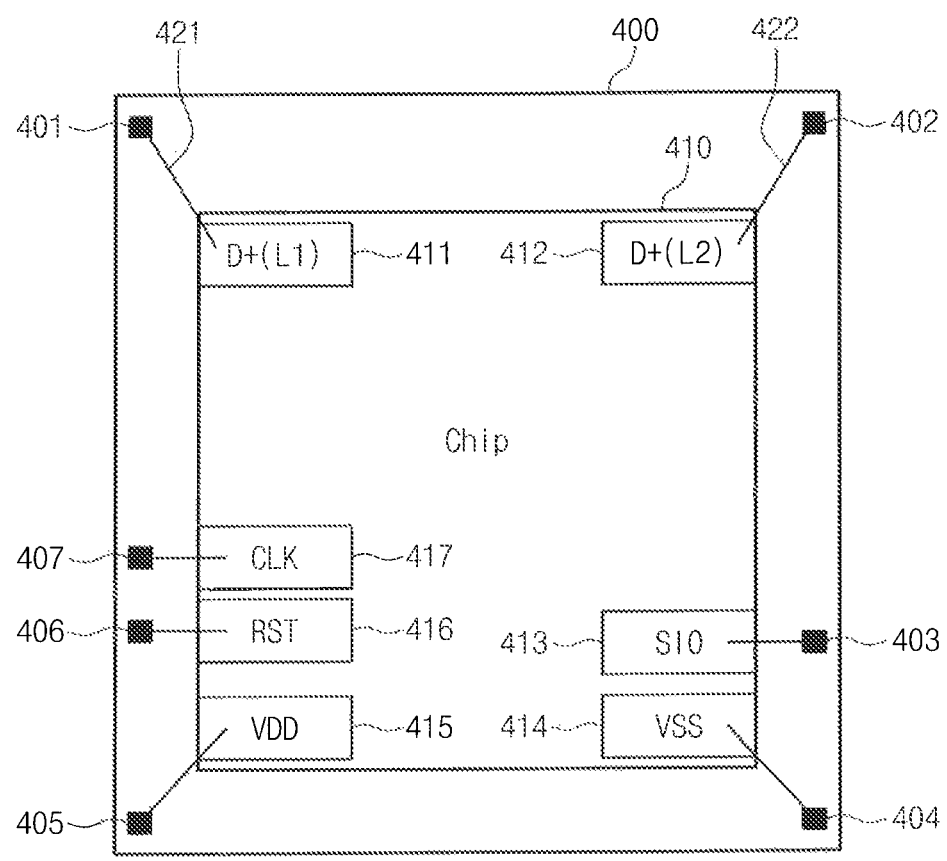
FIG. 4 is a drawing illustrating a smart card module in accordance with exemplary embodiments of the inventive concept.

FIG. 4 is a drawing illustrating a smart card module in accordance with exemplary embodiments of the present inventive concept.

Referring to FIG. 4, a smart card module 400 built in a smart card includes a printed circuit board (PCB) on which an integrated circuit chip 410 is mounted. An integrated circuit chip 410 is mounted on one side of the printed circuit board (PCB) and the other side of the printed circuit board (PCB) includes external contact pads provided in the international organization for standardization (ISO) 7916. The smart card module 400 comprises eight external contact pads provided in the international organization for standardization (ISO) 7916. When fabricating a smart card, a method is used that first, the smart card module 400 is constituted by packing the integrated circuit chip 410 on a printed circuit board (PCB) according to a chip on board (COB) package technology and then the smart card module 400 is inserted into a cavity of the card body.

The integrated circuit chip 410 includes chip pads 411~417 connected to an interface circuit integrated therein. The chip pads 411~417 are connected to contact pads 401~407 of the smart card module 400, respectively. The chip pads 411~417 of the integrated circuit chip 410 may be connected to the contact pads 401~407 in a wire bonding method. That is, the chip pad 411 may be connected to the contact pad 401 by a bonding wire 421 and the chip pad 412 may be connected to the contact pad 402 by the bonding wire 421. The contact pads 401~407 may be connected to external contact pads arranged on an opposite side of the smart card module 400 through contact plugs. In particular, the contact pads 401 and 402 may be connected to an antenna pattern (not shown) mounted on the printed circuit board (PCB) of the smart card module 400. Also, the contact pads 401 and 402 are connected to external contact pads of the smart card module 400 to be connected to USB data terminals of a host.

In the example illustrated in FIG. 4, when the integrated circuit chip 410 operates in the USB mode, it transmits/receives the data signals D+ and D− to/from the host through the chip pads 411 and 412, and when the integrated circuit chip 410 operates in a contactless mode, it transmits/receives the wireless signals L1 and L2 to/from the host through the chip pads 411 and 412.

Figure 5:
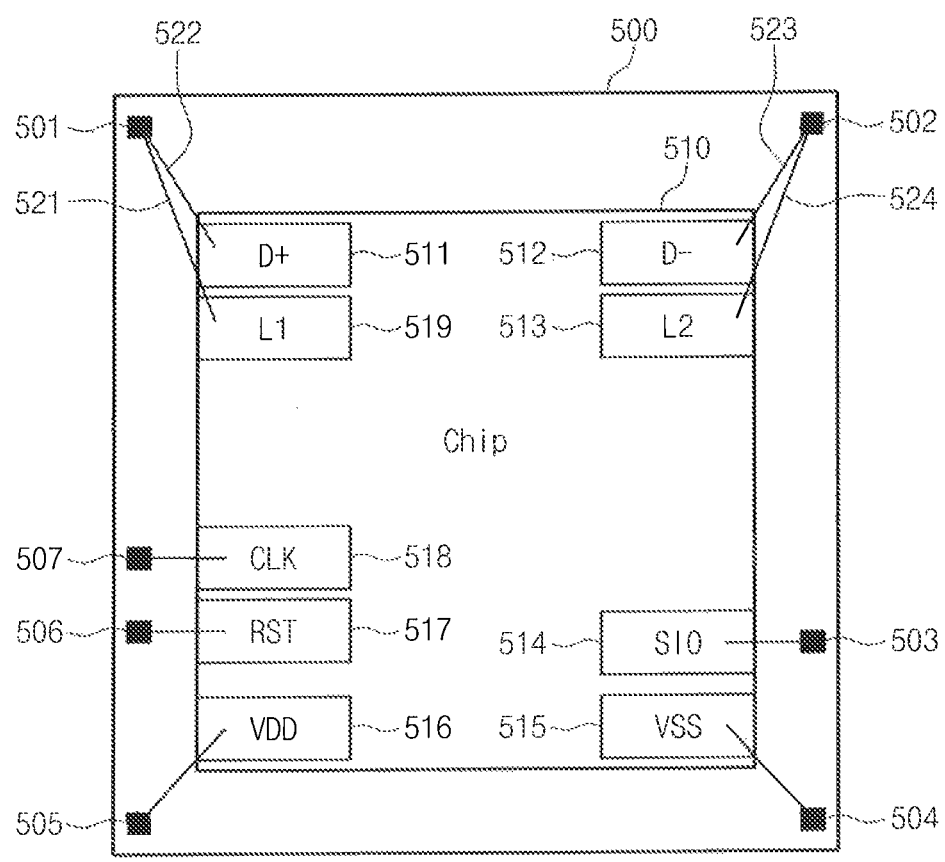
FIG. 5 is a drawing illustrating a smart card module in accordance with other exemplary embodiments of the inventive concept.

FIG. 5 is a drawing illustrating a smart card module in accordance with other exemplary embodiments of the inventive concept.

Referring to FIG. 5, unlike FIG. 4, an integrated circuit chip 510 mounted on a smart card module 500 includes chip pads 511 and 512 for the USB mode and chip pads 519 and 513 for a contactless mode that are separated from each other. That is, when the integrated circuit chip 510 operates in the USB mode, it transmits/receives the data signals D+ and D− to/from a host through the chip pads 511 and 512, and when the integrated circuit chip 510 operates in a contactless mode, it transmits/receives the wireless signals L1 and L2 to/from the host through the chip pads 519 and 513. Contact pads 501 and 502 are connected to an antenna pattern (not shown) mounted on a printed circuit board (PCB) of the smart card module 500. Also, the contact pads 501 and 502 are connected to external contact pads of the smart card module 500 to be connected to USB data terminals of the host.

However, unlike the smart card module 400 illustrated in FIG. 4, the chip pads 511 and 519 are connected to the contact pad 501 in common by bonding wires 521 and 522 and the chip pads 512 and 513 are connected to the contact pad 502 in common by bonding wires 523 and 524.

In the integrated circuit chip 510 mounted on a smart card module 500, the chip pads 511 and 512 for the USB mode and the chip pads 519 and 513 for a contactless mode are separately formed. An interface module (not shown) in the integrated circuit chip 510 is supplied with the power supply voltage VDD from a chip pad 516, and when receiving signals D+ and D− suitable for the USB standard from the chip pads 511 and 512, the interface module operates in the USB mode. If the interface module is not supplied with the power supply voltage VDD from the chip pad 516, it operates in a contactless mode using the chip pads 519 and 513.

According to embodiments of the inventive concept, a smart card can be realized that can support various interfaces through eight electric contacts defined in a regulation.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A smart card comprising:
   a first pad;
   a second pad;
   a third pad being supplied with a power supply voltage by wire;
   a first interface circuit to perform communication via a first type interface with an outside using the first and second pads, the first type interface being a contact type interface;
   a second interface circuit to perform communication via a second type interface with the outside using the first and second pads, the second type interface being the contactless type interface; and
   a mode selector to enable the first interface circuit when the power supply voltage is supplied through the third pad by wire and to enable the second interface circuit when the power supply voltage is not supplied through the third pad by wire.

2. The smart card of claim 1, wherein the second interface circuit performs communication via an interface with the outside according to a universal serial bus (USB) standard using the first and second pads.

3. The smart card of claim 1, wherein the second interface circuit performs communication via an interface with the outside according to the international organization for standardization (ISO) 14443 using the first and second pads.

4. The smart card of claim 1, wherein the second interface circuit checks whether a signal suitable for the USB standard is received and provides the checked result to the mode selector.

5. The smart card of claim 1, further comprising:
   fourth through sixth pads; and
   a third interface circuit to perform communication via a third type interface with the outside using the fourth through sixth pads, wherein the mode selector disables the first and second interface circuits when the power supply voltage is supplied through the third pad and a signal suitable for the USB standard is not received through the first and second pads.

6. An interface method of the interface module in a smart card including a plurality of pads, an interface module and an internal circuit block comprising:
determining whether a power supply voltage is supplied through a power supply pad;
performing communication via a first type interface between the outside and the internal circuit block using first and second pads when the power supply voltage is determined to be supplied through the power supply pad, the first type interface being a contact type interface; and
performing communication via a second type interface between the outside and the internal circuit block using the first and second pads when the power supply voltage is determined not to be supplied through the power supply pad, the second type interface being the contactless type interface.

7. The interface method of claim 6, wherein performing the operation via the first type interface comprises performing communication via an interface in accordance with the USB standard between the outside and the internal circuit block when the power supply voltage is supplied through the power supply pad and a signal suitable for the USB standard is received through the first and second pads.

8. The interface method of claim 6, wherein the smart card further comprises third through fifth pads, and the method further comprises:
performing communication via a third type interface between the outside and the internal circuit block using the third through fifth pads when the power supply voltage is supplied through the power supply pad and a signal suitable for the USB standard is not received through the first and second pads.

9. The interface method of claim 6, further comprising:
performing communication via a contactless type interface between the outside and the internal circuit block using the first and second pads and performing communication via a serial input output (SIO) interface between the outside and the internal circuit block using the third through fifth pads when the power supply voltage is supplied through the power supply pad and a signal that is not suitable for the USB standard is received through the first and second pads.

10. A smart card comprising:
an interface circuit including:
a first interface unit to perform communication via a first type of interface externally using a first set of contact pads to transmit data to a host by wire and wirelessly, the first type interface unit being a contact mode interface, and
a second interface unit to perform communication via a second type of interface externally using the first set of contact pads, the second type interface unit being the contactless mode interface;
a power supply voltage pad to receive power for an external host; and
a mode selector to enable the first interface unit when power is supplied through the third pad by wire and to enable the second interface unit when the power is not supplied to the power supply voltage pad.

11. The smart card of claim 10, wherein the first interface unit is a USB mode interface.

12. The smart card of claim 11, wherein the mode selector enables the first interface unit when power is supplied to the power supply pad, and enables the second interface unit when power is not supplied to the power supply pad.

13. The smart card of claim 12, wherein if the mode selector determines that power is supplied to the power supply pad, and a signal received through the first set of contact pads is not suitable to the USB standard, then the mode selector disables the first interface unit and the second interface unit and operates in a serial input output (SIO) mode.

14. The smart card of claim 12, further comprising:
fourth through sixth pads; and
a third interface unit to perform communication via a third type interface externally using the fourth through sixth pads,
wherein the mode selector disables the first and second interface units when the power supply voltage is supplied through the third pad and a signal suitable for the USB standard is not received through the first set of contact pads.

15. A method of interfacing a smart card having a plurality of pads, an interface module and an internal circuit block, the method comprising:
enabling a first type interface between the internal circuit block and an external device using a set of pads when a power supply voltage is supplied through a power supply pad, and enabling a second type interface between the internal circuit block and an external device using the set of pads when a power supply voltage is not supplied through the power supply pad, the first type interface being a contact type interface and the second type interface unit being the contactless type interface.

16. The method of claim 15, further comprising:
switching to a third type interface when it is determined that a power supply voltage is being supplied through a power supply pad while a predetermined signal is determined not to be suitable for the first or second type interface.

17. The method of claim 16, wherein the predetermined signal is a signal suitable for a USB standard, and the third type interface is a serial input output (SIO) interface.

18. The method of claim 15, wherein the external device is a host computer.

* * * * *